W. T. PETTET.
FISH BOX.
APPLICATION FILED MAY 25, 1921.

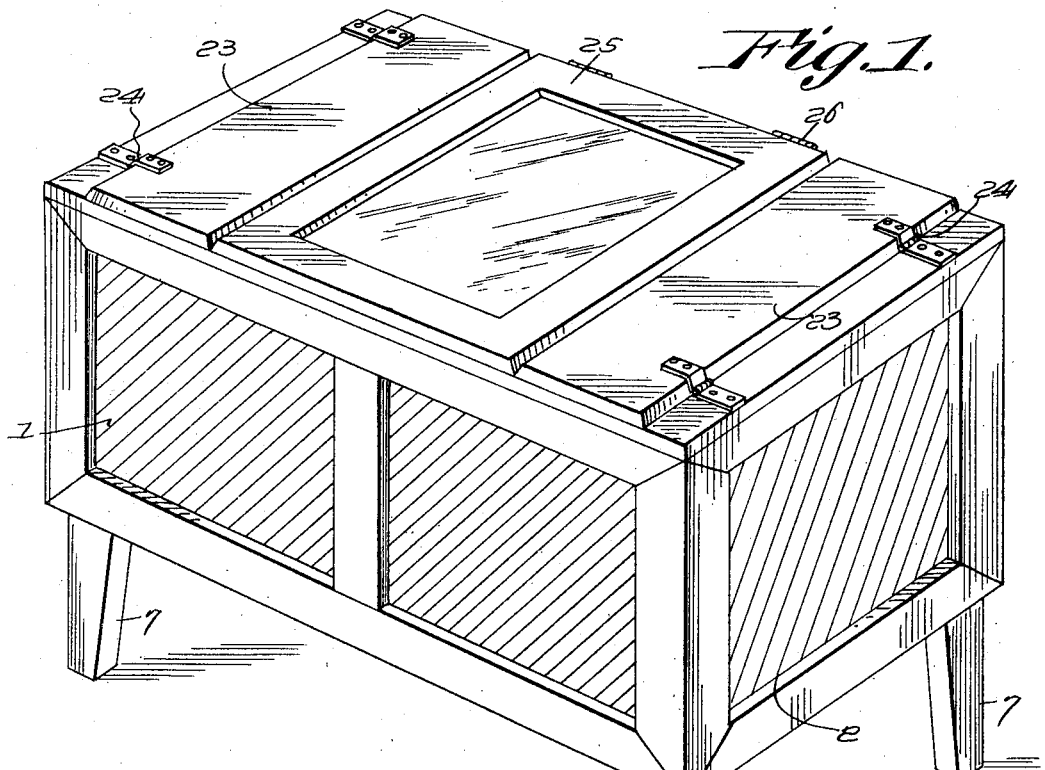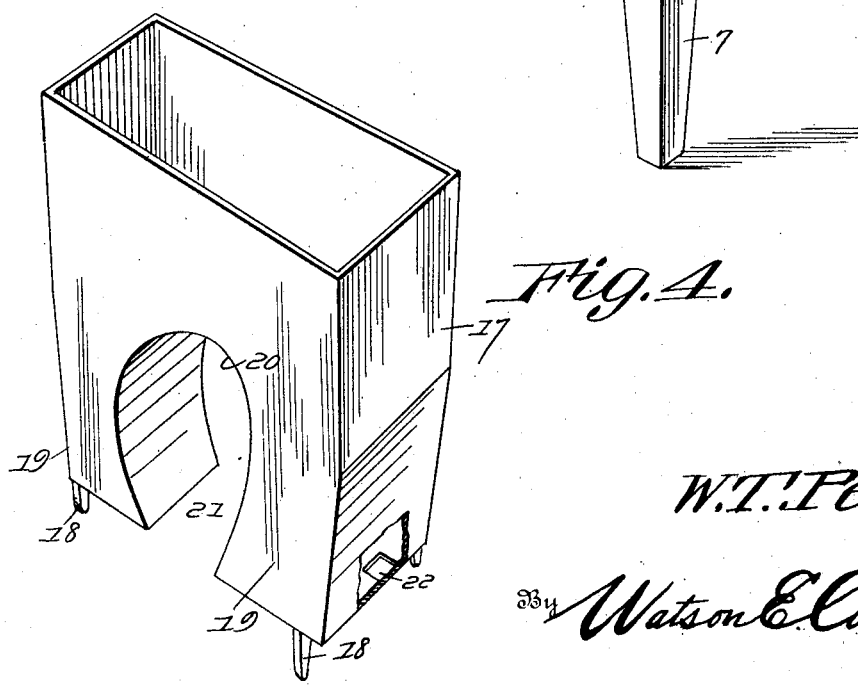

1,405,865.

Patented Feb. 7, 1922.
2 SHEETS—SHEET 2.

Inventor
W. T. Pettet,
By Watson E. Coleman
Attorney

UNITED STATES PATENT OFFICE.

WILLIAM THOMAS PETTET, OF WALNUT RIDGE, ARKANSAS, ASSIGNOR OF ONE-HALF TO THOMAS C. NEECE, OF WALNUT RIDGE, ARKANSAS.

FISH BOX.

1,405,865. Specification of Letters Patent. Patented Feb. 7, 1922.

Application filed May 25, 1921. Serial No. 472,579.

*To all whom it may concern:*

Be it known that I, WILLIAM THOMAS PETTET, a citizen of the United States, residing at Walnut Ridge, in the county of Lawrence and State of Arkansas, have invented certain new and useful Improvements in Fish Boxes, of which the following is a specification, reference being had to the accompanying drawings.

The present invention has for its purpose the provision of a device of this kind for icing and insuring the preservation of fish.

Another purpose embodies the provision of a fish box, wherein a main drip pan is supported, with ice bunkers at either end of the box, including auxiliary communicating drip pans under the bunkers and overlying the main drip pan, so that the ice water and salt from the bunkers may be carried off to the main drip pan, and then allowed to discharge from the box, the fish adapted to be supported upon the main drip pan, so as to become iced and maintained preserved, due to the low temperature in the box.

Still another purpose embodies the provision of an ice bunker, which may be used in connection with any form of refrigerating apparatus, either a home or family refrigerator, or a refrigerator car, or any large ice houses which have refrigerating compartments.

A further purpose consists in the provision of an ice bunker having an arch, thereby causing to be formed a space under the bunker, to insure a low temperature for the fish or other food, which may be supported upon the main drip pan.

As an additional purpose, it is the aim to provide a fish box of this character, wherein the wall thereof is provided with an insulation of mineral wool and cork board, including a dead air space between such mineral wool and cork board, in order to insure maintaining a low temperature on the interior of the box, and acting to preclude the exterior atmosphere.

Also the invention aims to provide suitable closures for the fish compartment and the ice bunkers, the closure for the fish compartment partly overlying the closures for the bunkers, said closures being hinged upon the box so as to open at right angles to each other, so that the main and auxiliary drip pans including the ice bunkers may be removed or replaced at any time.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of the improved fish box constructed in accordance with the invention.

Figure 4 is an enlarged detail view in perspective of one of the ice bunkers removed.

Figure 2:
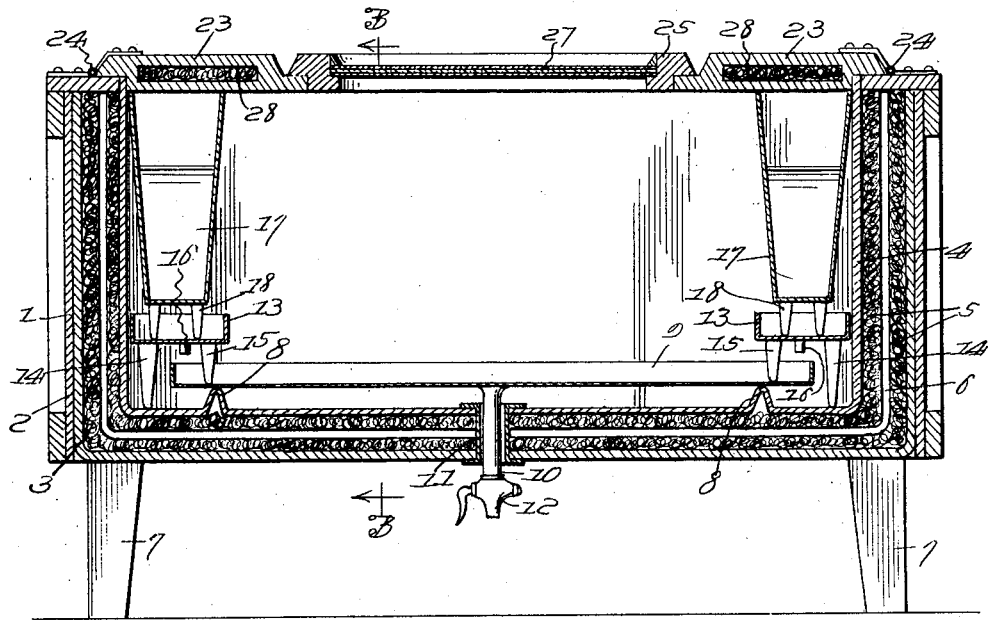
Figure 2 is a longitudinal sectional view through the same, showing the mineral wool and cork board insulation including the dead air space, and also showing the main and auxiliary drip pans, and the ice bunkers.
Figure 3:
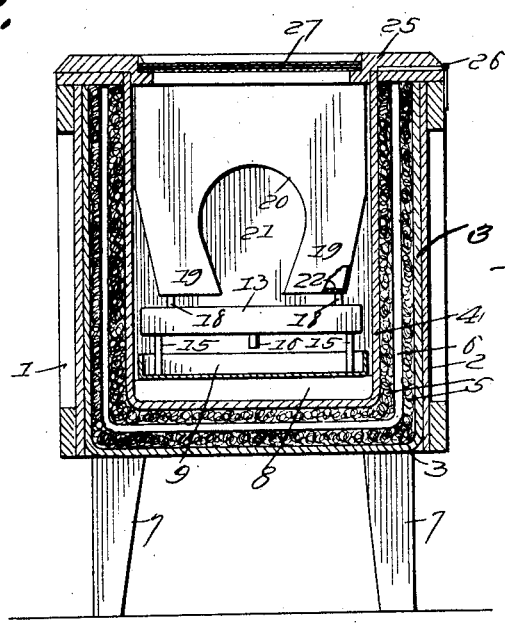
Figure 3 is a transverse sectional view on line 3—3 of Figure 2, showing the arch of the ice bunkers, causing to be formed low temperature air spaces.

Referring to the drawings, 1 designates a box, which may be in the form as shown in the drawings, or constituting a refrigerator or similar structure. This box has an exterior of wood, either oak or pine or the like, preferably the former, such as shown at 2, there being a metal lining 3 adjacent the wood, and an interior metal surface 4, which is preferably enamelled or otherwise coated to insure a preservation of the metal. Arranged adjacent the inner surfaces of the metal linings 3 and 4 is an insulation of mineral wool and cork board 5, there being a dead air space 6 separating the mineral wool and cork board. By the provision of a wall of this character the exterior temperature is precluded from the interior of the box. The box may be supported upon any suitable legs 7, and rising upwardly from the bottom of the interior of the box are supports 8 for the main drip pan 9, which also supports the fish and the like.

A drain pipe 10 extends from the main drain pan 9 and through a metal tube 11, which passes through the thickness of the bottom of the box. The lower end of the drain pipe 10 has a drain cock 12, for carrying off the sediment and the like that may collect in the drip pan.

Auxiliary drip pans 13 are arranged on the interior of the box, one adjacent each end of the interior of the box. These drip pans 13 have supporting legs 14 and 15. The legs 14 engage the surface of the bottom of the box, while the legs 15 engage the interior of the main drip pan 9. The auxiliary drip pans have outlets, such as short tubes or spouts 16, which overlie the ends of the main drip pan 9, for the purpose of carrying the ice water thereinto.

Ice bunkers 17 are provided on the interior of the box, and have supporting feet 18, which engage the bottoms of the auxiliary drip pans. The ice bunkers are of the shape or contour as shown in the detail view of Figure 4, therefore are provided with legs 19, with an intermediate arch 20, causing to be formed spaces 21. The legs 19 have drip openings 22, through which the water from the bunkers pass into the auxiliary drip pans, and then into the main drip pan. The bunkers receive crushed ice (each particle being approximately the size of an egg), or crushed to a relatively fine degree, is deposited in the bunkers, and act to fill the legs of the bunkers. Rock salt is also deposited in the bunkers with the ice, to insure producing a freezing temperature. In fact a deposit of ice is first placed in each bunker, then a deposit of salt, then a deposit of ice, and then salt and so on until each bunker is filled. In this way a very low temperature may be provided on the interior of the box. Closures 23 are hinged at 24 to the box, so as to close the bunkers. These closures are arranged at the ends of the box. A third closure 25 is hingedly mounted at 26 to the side of the box, for closing the center chamber, where the fish and the like are placed. The closure 26 is provided with three thicknesses of glass 27, so as to preclude the exterior temperature. The closures 23 have a packing or an insulation of mineral wool and cork board 28, to insure precluding the exterior temperature.

A fish box of this character has been found to keep fish and the like thoroughly iced and preserved, and it is obvious that the closure for the fish compartment may be opened without disturbing the closures for the ice bunkers. The interior of the box derives the low temperature from the walls of the arched ice bunkers. This low temperature remains very close to the surface of the fish or the like, and keeps them iced, particularly since the drippings from the auxiliary drip pans flow into the main drip pan.

The invention having been set forth, what is claimed as being useful is:

1. In a fish icing box, a casing having a fish receiving compartment, said compartment having on its bottom at its opposite ends upstanding ribs, a main drip pan supported on said ribs and provided with means for carrying off the drippings exteriorly of the compartment, auxiliary drip pans having legs engaging the ends of the bottom of the fish compartment and provided with additional legs engaging the bottom of the main drip pan, said auxiliary drip pans having means carrying the drippings into the main drip pan, ice bunkers supported on the auxiliary drip pans and communicating therewith, said ice bunkers having heat absorbing spaces, and closures for the ice bunkers and the fish compartment.

2. In a fish icing box, a casing having a fish receiving compartment, said compartment having on its bottom at its opposite ends upstanding ribs, a main drip pan supported on said ribs and provided with means for carrying off the drippings exteriorly of the compartment, auxiliary drip pans having legs engaging the ends of the bottom of the fish compartment and provided with additional legs engaging the bottom of the main drip pan, said auxiliary drip pans having means carrying the drippings into the main drip pan, ice bunkers supported on the auxiliary drip pans and communicating therewith, said ice bunkers having heat absorbing spaces, closures hingedly mounted on the ends of the casing for closing the ice bunkers, and an additional closure hingedly mounted upon the edge of one of the sides of the casing and overlying the first closures, for closing the center of the fish compartments.

In testimony whereof I hereunto affix my signature.

WILLIAM THOMAS PETTET.